(12) United States Patent
Genden et al.

(10) Patent No.: US 10,831,501 B2
(45) Date of Patent: *Nov. 10, 2020

(54) MANAGING AN ISSUE QUEUE FOR FUSED INSTRUCTIONS AND PAIRED INSTRUCTIONS IN A MICROPROCESSOR

(71) Applicant: International Business Machines Corporation, Armonk, NY (US)

(72) Inventors: Michael J. Genden, Austin, TX (US); Hung Q. Le, Austin, TX (US); Dung Q. Nguyen, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,445

(22) Filed: May 9, 2019

(65) Prior Publication Data

US 2019/0265978 A1 Aug. 29, 2019

Related U.S. Application Data

(63) Continuation of application No. 15/795,772, filed on Oct. 27, 2017, now Pat. No. 10,394,565, which is a continuation of application No. 15/667,264, filed on Aug. 2, 2017, now Pat. No. 10,387,147.

(51) Int. Cl.
*G06F 9/38* (2018.01)

(52) U.S. Cl.
CPC .......... *G06F 9/3853* (2013.01); *G06F 9/3836* (2013.01); *G06F 9/3838* (2013.01); *G06F 9/3855* (2013.01)

(58) Field of Classification Search
CPC .... G06F 9/3836; G06F 9/3853; G06F 9/3855; G06F 9/3838
See application file for complete search history.

(56) References Cited

U.S. PATENT DOCUMENTS

| | | |
|---|---|---|
| 8,683,180 B2 | 3/2014 | Barrick et al. |
| 9,367,322 B1 | 6/2016 | Brownscheidle et al. |
| 9,424,045 B2 | 8/2016 | Airaud et al. |
| 10,387,147 B2 | 8/2019 | Genden et al. |

(Continued)

FOREIGN PATENT DOCUMENTS

WO WO-2014/085472 A1 6/2014

OTHER PUBLICATIONS

AUS920170069US04, Appendix P; List of IBM Patent or Applications Treated as Related, Sep. 3, 2019, 2 pages.

*Primary Examiner* — Keith E Vicary
(74) *Attorney, Agent, or Firm* — Bryan Bortnick

(57) ABSTRACT

Disclosed is a method for managing an issue queue for fused instructions and paired instructions in a microprocessor. The method includes dispatching a fused instruction to a first entry in a double issue queue; dispatching two paired instructions to a second entry in the double issue queue; issuing the fused instruction during a single cycle to an execution unit in response to determining, by the issue queue logic, that the fused instruction is ready to issue; and issuing, by the issue queue logic, the first instruction of the two paired instructions to the execution unit in response to determining, by the issue queue logic, that the first instruction of the two paired instructions is ready to issue.

7 Claims, 6 Drawing Sheets

(56) References Cited

U.S. PATENT DOCUMENTS

| | | |
|---|---|---|
| 10,394,565 B2 | 8/2019 | Genden et al. |
| 2002/0087955 A1* | 7/2002 | Ronen .................. G06F 9/3001 |
| | | 717/151 |
| 2007/0204137 A1 | 8/2007 | Tran |
| 2008/0320478 A1 | 12/2008 | Singh et al. |
| 2010/0115248 A1* | 5/2010 | Ouziel .................. G06F 9/3016 |
| | | 712/226 |
| 2010/0299505 A1* | 11/2010 | Uesugi ................ G06F 9/30181 |
| | | 712/221 |
| 2012/0260072 A1 | 10/2012 | Wang et al. |
| 2013/0086365 A1 | 4/2013 | Gschwind et al. |
| 2014/0281397 A1 | 9/2014 | Loktyukhin et al. |
| 2015/0082009 A1 | 3/2015 | Gschwind et al. |
| 2016/0004508 A1 | 1/2016 | Elmer |
| 2019/0042238 A1 | 2/2019 | Genden et al. |
| 2019/0042239 A1 | 2/2019 | Genden et al. |
| 2019/0265979 A1 | 8/2019 | Genden et al. |

\* cited by examiner

Dispatcher 200

Dispatch A Fused Instruction To A First Entry In A Double Issue Queue, Wherein The Fused Instruction Occupies Two Halves Of The First Entry In The Double Issue Queue 302

Dispatch Two Paired Instructions To A Second Entry In The Double Issue Queue, Wherein A First Instruction Of The Two Paired Instructions Occupies A First Half Of The Second Entry In The Double Issue Queue, And Wherein A Second Instruction Of The Two Paired Instructions Occupies A Second Half Of The Second Entry In The Double Issue Queue 304

Issue Queue Logic 208

Issue, By Issue Queue Logic, The Fused Instruction During A Single Cycle To An Execution Unit In Response To Determining, By The Issue Queue Logic, That The Fused Instruction Is Ready To Issue 306

Issue, By The Issue Queue Logic, The First Instruction Of The Two Paired Instructions To The Execution Unit In Response To Determining, By The Issue Queue Logic, That The First Instruction Of The Two Paired Instructions Is Ready To Issue 308

FIG. 3

Dispatcher 200

Dispatch A Fused Instruction To A First Entry In A Double Issue Queue, Wherein The Fused Instruction Occupies Two Halves Of The First Entry In The Double Issue Queue 302

Add A Slot In The Even Age Array For A First Half Of The Fused Instruction And Adding A Slot In The Odd Age Array For A Second Half Of The Fused Instruction 502

Dispatch Two Paired Instructions To A Second Entry In The Double Issue Queue, Wherein A First Instruction Of The Two Paired Instructions Occupies A First Half Of The Second Entry In The Double Issue Queue, And Wherein A Second Instruction Of The Two Paired Instructions Occupies A Second Half Of The Second Entry In The Double Issue Queue 304

Issue Queue Logic 208

Issue, By Issue Queue Logic, The Fused Instruction During A Single Cycle To An Execution Unit In Response To Determining, By The Issue Queue Logic, That The Fused Instruction Is Ready To Issue 306

Issue, By The Issue Queue Logic, The First Instruction Of The Two Paired Instructions To The Execution Unit In Response To Determining, By The Issue Queue Logic, That The First Instruction Of The Two Paired Instructions Is Ready To Issue 308

Determine, By The Issue Queue Logic, That The Fused Instruction Is The Oldest Ready Instruction In The Even Age Array, Wherein At Least One Instruction In The Odd Age Array Is Older Than The Fused Instruction And Ready To Issue 504

Issue, By The Issue Queue Logic, The Fused Instruction Before The At Least One Instruction In The Odd Age Array That Is Older Than The Fused Instruction And Ready To Issue 506

MANAGING AN ISSUE QUEUE FOR FUSED INSTRUCTIONS AND PAIRED INSTRUCTIONS IN A MICROPROCESSOR

CROSS-REFERENCE TO RELATED APPLICATIONS

This application is a continuation application of and claims priority from U.S. patent application Ser. No. 15/795,772, filed Oct. 27, 2017, which is a continuation application of and claims priority from U.S. patent application Ser. No. 15/667,264, filed Aug. 2, 2017.

BACKGROUND

Field of the Invention

The field of the invention is data processing, or, more specifically, methods, apparatus, and products for managing an issue queue for fused instructions and paired instructions in a microprocessor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for managing an issue queue for fused instructions and paired instructions in a microprocessor are disclosed in this specification. Managing an issue queue for fused instructions and paired instructions in a microprocessor includes dispatching a fused instruction to a first entry in a double issue queue, wherein the fused instruction occupies two halves of the first entry in the double issue queue; dispatching two paired instructions to a second entry in the double issue queue, wherein a first instruction of the two paired instructions occupies a first half of the second entry in the double issue queue, and wherein a second instruction of the two paired instructions occupies a second half of the second entry in the double issue queue; issuing, by issue queue logic, the fused instruction during a single cycle to an execution unit in response to determining, by the issue queue logic, that the fused instruction is ready to issue; and issuing, by the issue queue logic, the first instruction of the two paired instructions to the execution unit in response to determining, by the issue queue logic, that the first instruction of the two paired instructions is ready to issue.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 3 sets forth a flow chart illustrating an exemplary method for managing an issue queue for fused instructions and paired instructions in a microprocessor according to embodiments of the present invention.

FIG. 5 sets forth a flow chart illustrating an exemplary method for managing an issue queue for fused instructions and paired instructions in a microprocessor according to embodiments of the present invention.

DETAILED DESCRIPTION

Figure 1:
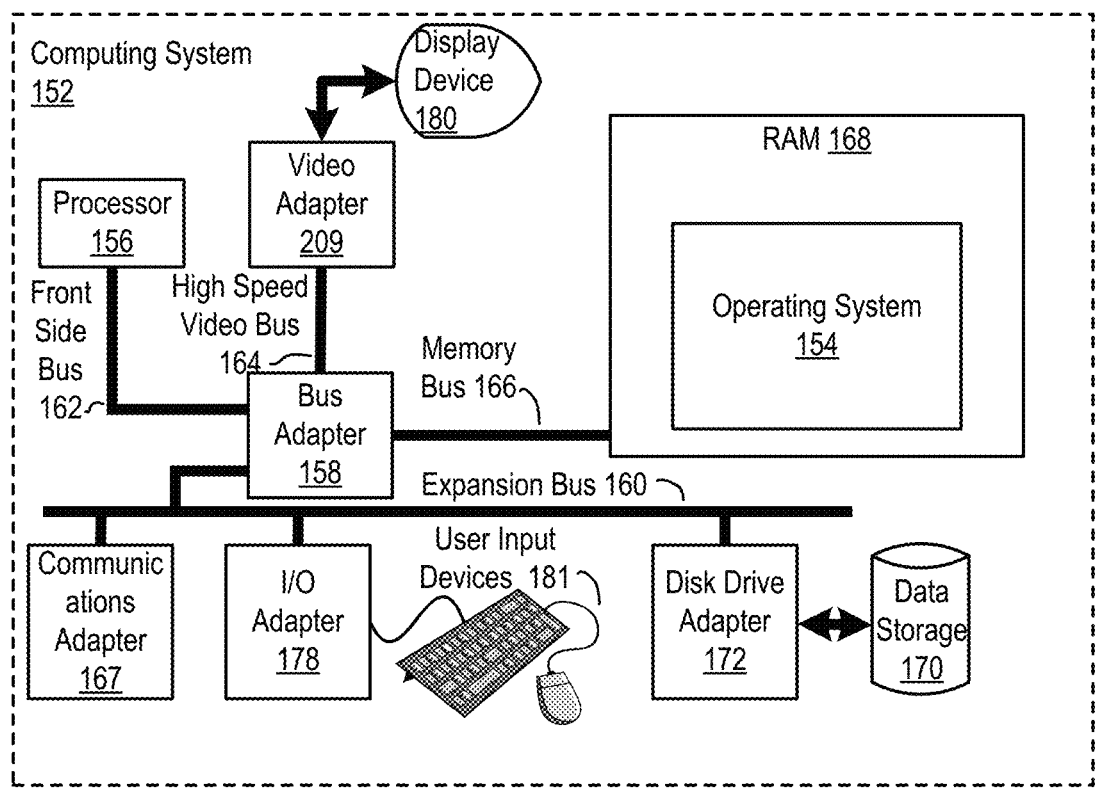
FIG. 1 sets forth a block diagram of an example system configured for managing an issue queue for fused instructions and paired instructions in a microprocessor according to embodiments of the present invention.

Exemplary methods, apparatus, and products for managing an issue queue for fused instructions and paired instructions in a microprocessor in accordance with the present invention are described with reference to the accompanying drawings, beginning with FIG. 1. FIG. 1 sets forth a block diagram of automated computing machinery comprising an exemplary computing system (152) configured for managing an issue queue for fused instructions and paired instructions in a microprocessor according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for managing an issue queue for fused instructions and paired instructions in a microprocessor according to embodiments of the present invention include UNIX™, Linux™, Microsoft Windows™, AIX™, IBM's iOS™, and others as will occur to those of skill in the art. The operating system (154) in the example of FIG. 1 is shown in RAM (168), but many components of such software typically are stored in non-volatile memory also, such as, for example, on a disk drive.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for managing an issue queue for fused instructions and paired instructions in a microprocessor according to embodiments of the present invention include Integrated Drive Electronics (IDE') adapters, Small Computer System Interface (SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing an issue queue for fused instructions and paired instructions in a microprocessor according to embodiments of the present invention include modems for wired dial-up communications, Ethernet (IEEE 802.3) adapters for wired data communications, and 802.11 adapters for wireless data communications.

Figure 2:
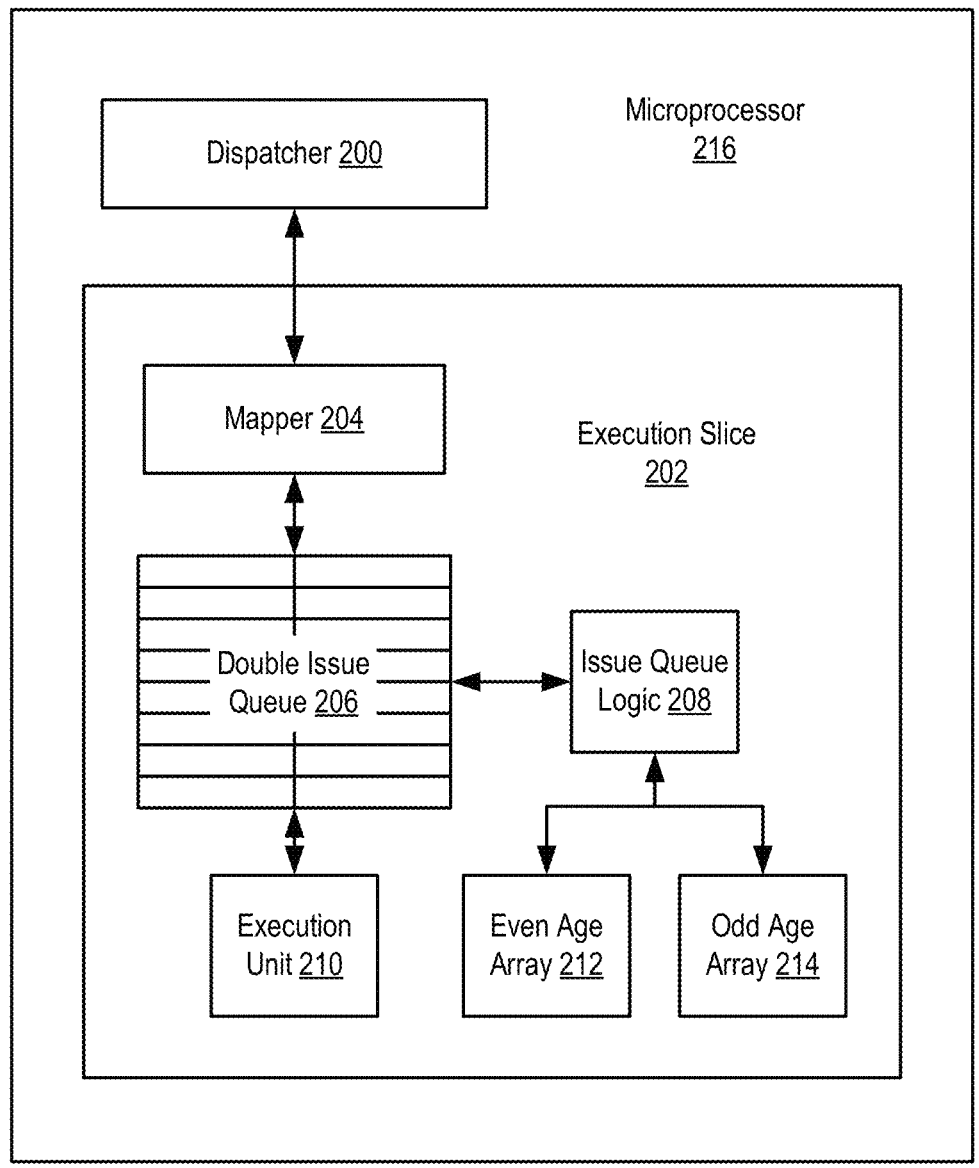
FIG. 2 sets forth a block diagram of an example system configured for managing an issue queue for fused instructions and paired instructions in a microprocessor according to embodiments of the present invention.

FIG. 2 shows an exemplary microprocessor for managing an issue queue for fused instructions and paired instructions according to embodiments of the present invention. As shown in FIG. 2, the exemplary microprocessor (216) includes a dispatcher (200) and an execution slice (202). The execution slice (202) includes a mapper (204) a double issue queue (206), issue queue logic (208), an execution unit (210), an even age array (212), and an odd age array (214).

The microprocessor (216) is a computer processor (156) capable of executing computer instructions. The microprocessor (216) may be a multi-slice processor that includes multiple execution slices, such as execution slice (202). The execution slice (202) is a collection of components and circuits configured to support the execution of instructions, including elements not shown in FIG. 2, such as general purpose registers, a history buffer, an arithmetic logic unit (including a vector scalar unit, a floating point unit, and others), etc.

The term 'multi-slice' as used in this specification refers to a processor having a plurality of similar or identical sets of components, where each set may operate independently of all the other sets or in concert with the one or more of the other sets. Each execution slice may be associated with a single load/store slice to form a single processor slice, and multiple processor slices may be configured to operate together.

The dispatcher (200) receives computer instructions from an instruction cache or other source, and dispatches the computer instructions among execution slices, such as execution slice (202). The computer instructions from the instruction cache may correspond to software written by a user and compiled for the microprocessor (216).

The dispatcher (200) may refer to a dispatch network that includes multiple elements. One such element may perform instruction fusing using the received computer instructions. A fused instruction is an instruction that has been generated from multiple computer instructions. A fused instruction may be a combination of two instructions in which one instruction is dependent upon the other instruction. Fused instructions may be two instructions placed together to be executed together (e.g., in parallel, during the same cycle). One fused instruction may occupy two (or more) entries in an issue queue, or one full entry in a double issue queue (e.g. double issue queue (206)).

The dispatcher (200) may also pair instructions together for execution as paired instructions. Paired instructions are two or more instructions that may be placed in the same entry in the double issue queue (206). Paired instructions may also be executed in parallel (e.g., together during the same cycle). Instructions may be paired if executing both instructions would consume less than a maximum available number of execution unit resources. For example, two instructions may be paired if the total operands between the two instructions is less than (or equal to) the number of available read ports. Paired instructions may, if necessary, be dispatched and issued separately.

The mapper (204) tracks the instructions as the instructions move through the execution slice. The mapper (204) may read the source and destination of each instruction, and determine the location of the source and destination in a data register file.

The double issue queue (206) is an issue queue with entries capable of storing at least two instructions, or at least one fused instruction, per entry. The double issue queue (206) may be two or more queues with corresponding sub-entries, with each sub-entry in each queue having corresponding sub-entries in each other queue, and with each group of corresponding sub-entries making up one entry in the double issue queue. Each entry in the double issue queue (206) is capable of storing a fused instruction, two paired instructions, or two individual instructions. Individual instructions are non-fused, non-paired instructions placed independently into the double issue queue (206). As used herein, the term "half" refers to a portion or sub-entry of an entry in the double issue queue (206), and does not limit the number of portions or sub-entries in each entry.

The issue queue logic (208) is circuitry configured to manage the double issue queue (206). The issue queue logic (208) tracks each entry in the double issue queue (206) and determines the next instruction or instructions to issue to the execution unit (210). The issue queue logic (208) also tracks the age and dependencies of each instruction in the double issue queue (206) using age arrays (even age array (212), odd age array (214)). The issue queue logic (208) may select the next instruction or instructions to issue based on the content of the age arrays (even age array (212), odd age array (214)).

The age arrays (even age array (212), odd age array (214)) are data structures used by the issue queue logic (208) to track the age and dependencies of each instruction in the double issue queue (206). The age arrays (even age array (212), odd age array (214)) include a slot for each instruction, or portion of an instruction, in the double issue queue (206). For example, a fused instruction constructed from two instructions may have two corresponding slots in the age arrays (one slot in the even age array (212) and one slot in the odd age array (214)) each with the same age. As another example, two paired instructions may each have a corresponding slot in the age arrays (a slot for the first paired instruction in the even age array (212) and a slot for the second paired instruction in the odd age array (214)) each with the same age (assuming the paired instructions were placed in the double issue queue at the same time). Finally, as yet another example, an individual instruction may have one slot in one of the age arrays depending upon the location of the entry in the double issue queue (206) (e.g., either the even age array (212) or odd age array (214)). The age indicator for the individual instruction will be different from the age indicator in the corresponding slot in the other age array (assuming that the individual instruction was not placed in the double issue queue at the same time as the instruction placed in the other half of the double issue queue entry).

The issue queue logic (208) may maintain a different age array for each conceptual "column" of the double issue queue (206). For example, a double issue queue (206) with entries capable of storing two individual instructions, two paired instructions, or a single fused instruction constructed from two instructions may include two conceptual columns with each conceptual row representing a single entry in the double issue queue. In this example, the issue queue logic (208) may maintain two age arrays, such as an even age array (212) and an odd age array (214), where the even age array (212) tracks the age and dependencies for the first half of each entry in the double issue queue (206), and the odd age array (214) tracks the age and dependencies for the second half of each entry in the double issue queue (206).

Each slot in the age arrays may store the age (or age indicator) of the corresponding instruction. The age of the instruction may be the elapsed time since the instruction was placed in the double issue queue. Each slot in the age array may also store an indication of the readiness of each data upon which the instruction depends. Specifically, a slot in the age array for an instruction may indicate whether that instruction is dependent upon the results of other instructions, and whether those results are ready to be read by the instruction.

The execution unit (210) is a collection of circuits configured to execute instructions from the double issue queue (206). The execution unit (210) may also store the results from calculations and operations in registers or other memory locations.

For further explanation, FIG. 3 sets forth a flow chart illustrating an exemplary method for managing an issue queue for fused instructions and paired instructions in a microprocessor according to embodiments of the present invention that includes dispatching (302) a fused instruction to a first entry in a double issue queue, wherein the fused instruction occupies two halves of the first entry in the double issue queue. Dispatching (302) a fused instruction to a first entry in a double issue queue, wherein the fused instruction occupies two halves of the first entry in the double issue queue may be carried out by a dispatcher issuing the fused instruction to the double issue queue. The dispatcher may be notified of an available entry in the double issue queue, and subsequently target the available entry for placement of the fused instruction. The fused instruction may occupy an entire entry in the double issue queue.

The method of FIG. 3 further includes dispatching (304) two paired instructions to a second entry in the double issue queue, wherein a first instruction of the two paired instructions occupies a first half of the second entry in the double issue queue, and wherein a second instruction of the two paired instructions occupies a second half of the second entry in the double issue queue. Dispatching (304) two paired instructions to a second entry in the double issue queue, wherein a first instruction of the two paired instructions occupies a first half of the second entry in the double issue queue, and wherein a second instruction of the two paired instructions occupies a second half of the second entry in the double issue queue may be carried out by a dispatcher issuing the two paired instructions to the double issue queue. The dispatcher may be notified of an available entry in the double issue queue, and subsequently target the available entry for placement of the two paired instructions. Each half of the second entry may store one of the two paired instructions. If the second entry includes two halves, then the two paired instructions may occupy an entire entry in the double issue queue.

The first entry may be adjacent to the second entry in the double issue queue. The double issue queue may be configured such that any entry may store one fused instruction, two paired instructions, or two individual instructions. Accordingly, any entry storing one type of instruction may be adjacent to (i.e., immediately next to) any other type of instruction.

The method of FIG. 3 further includes issuing (306), by issue queue logic (208), the fused instruction during a single cycle to an execution unit in response to determining, by the issue queue logic (208), that the fused instruction is ready to issue. Issuing (306), by issue queue logic (208), the fused instruction during a single cycle to an execution unit in response to determining, by the issue queue logic (208), that the fused instruction is ready to issue may be carried out by the issue queue logic accessing one or more age arrays for the double issue queue. The fused instruction may be ready to issue if the slots in the age arrays for the fused instruction indicate a satisfaction of the factors necessary for issuing the fused instruction. The factors may include whether each of the dependencies of the fused instruction are ready to be read. The factors may also include whether the age of the fused instruction has reached an age threshold, such as being the oldest instruction in at least one age array with data dependencies that are ready to be read.

The fused instruction may be ready if at least one half of the fused instruction has reached the age threshold within that instruction half's respective age array. For example, the first half of a fused instruction may be tracked in an even age array, and the second half of the fused instruction may be tracked in an odd age array. Once each of the dependencies become available and the first half of the fused instruction has reached an age threshold within the even age array (e.g., the first half of the instruction is the oldest ready instruction tracked in the even age array), then the fused instruction may be issued regardless of whether the second half of the fused instruction has reached an age threshold in the odd age array. The fused instruction may issue even if the second half of the fused instruction has not reached the age threshold (e.g., is not the oldest ready instruction) in the odd age array (e.g., there is at least one instruction tracked by the odd age array with all required dependencies ready and is older than the fused instruction).

The issue queue logic (208) may be notified that the execution unit is available to execute a fused instruction. In response, the issue queue logic (208) may then search each age array for a fused instruction that is the oldest ready to issue fused instruction in that respective array, and issue the fused instruction that is the oldest ready to issue fused instruction in at least one age array, regardless of whether that fused instruction is the oldest ready to issue instruction in any other age array.

The method of FIG. 3 further includes issuing (308), by the issue queue logic (208), the first instruction of the two paired instructions to the execution unit in response to determining, by the issue queue logic (208), that the first instruction of the two paired instructions is ready to issue. Issuing (308), by the issue queue logic (208), the first instruction of the two paired instructions to the execution unit in response to determining, by the issue queue logic (208), that the first instruction of the two paired instructions is ready to issue may be carried out by the issue queue logic accessing one or more age arrays for the double issue queue. The issue queue logic may determine that the first instruction of the paired instructions has each required data dependency available and has reached an age threshold (e.g., the first instruction is the oldest ready instruction in the age array). The first instruction may be issued with (i.e., in parallel during the same cycle) the second instruction, or may be issued independently.

Once the fused instruction is issued, both halves of the first entry in the double issue queue are deallocated for use by another fused instruction, two paired instructions, or two individual instructions. Once the first instruction of the two paired instructions is issued, the first half of the second entry is deallocated for use by one paired instruction or an individual instruction. If the first instruction of the paired instructions is issued with the second instruction of the paired instructions, both halves of the second entry in the double issue queue are deallocated for use by a fused instruction, two other paired instructions, or two individual instructions.

Figure 4:
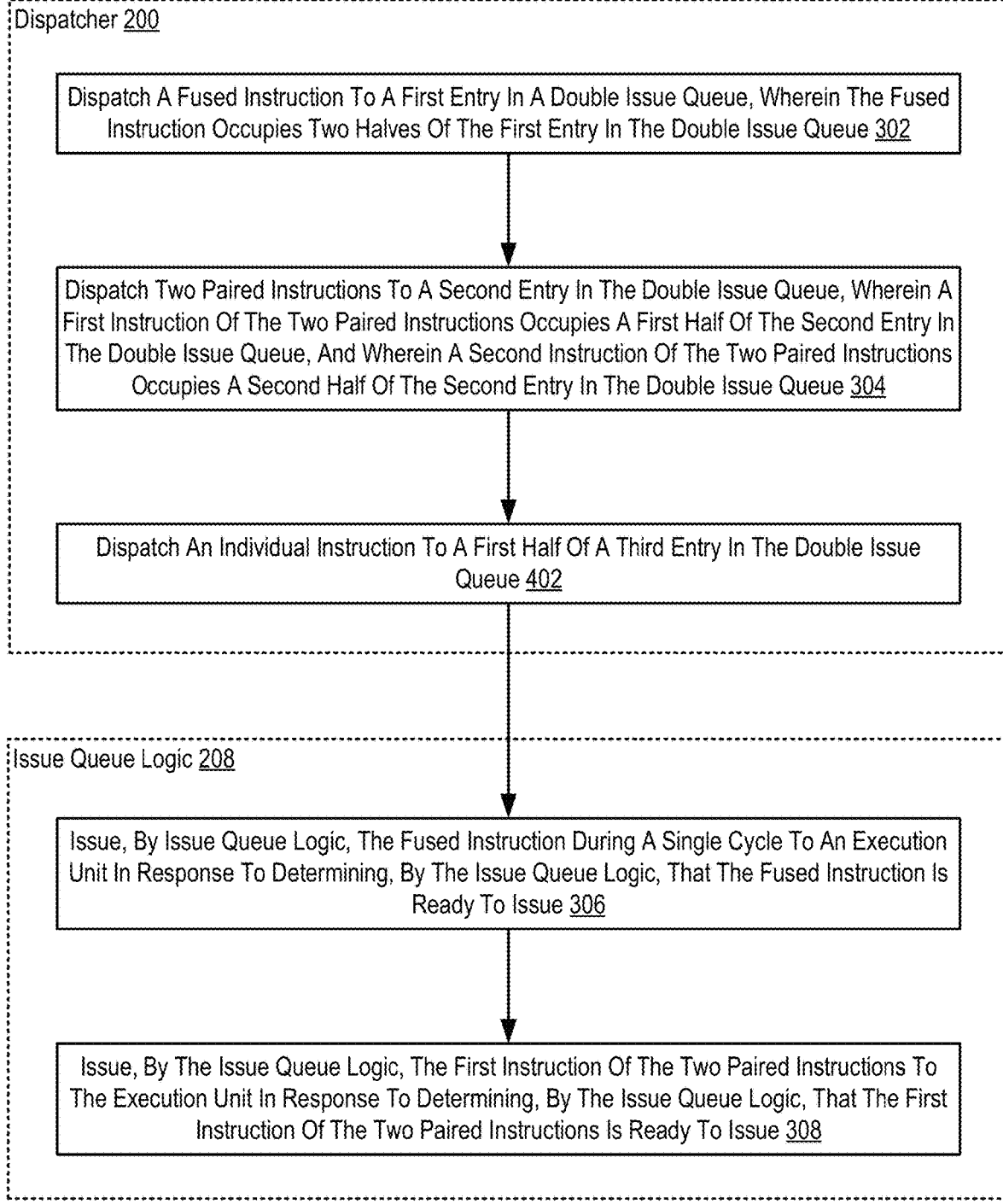
FIG. 4 sets forth a flow chart illustrating an exemplary method for managing an issue queue for fused instructions and paired instructions in a microprocessor according to embodiments of the present invention.

For further explanation, FIG. 4 sets forth a flow chart illustrating a further exemplary method for managing an issue queue for fused instructions and paired instructions in a microprocessor according to embodiments of the present invention that includes dispatching (302) a fused instruction to a first entry in a double issue queue, wherein the fused instruction occupies two halves of the first entry in the double issue queue; dispatching (304) two paired instructions to a second entry in the double issue queue, wherein a first instruction of the two paired instructions occupies a first half of the second entry in the double issue queue, and wherein a second instruction of the two paired instructions occupies a second half of the second entry in the double issue queue; issuing (306), by issue queue logic (208), the fused instruction during a single cycle to an execution unit in response to determining, by the issue queue logic (208), that the fused instruction is ready to issue; and issuing (308), by the issue queue logic (208), the first instruction of the two paired instructions to the execution unit in response to determining, by the issue queue logic (208), that the first instruction of the two paired instructions is ready to issue.

The method of FIG. 4 differs from the method of FIG. 3, however, in that the method of FIG. 4 further includes dispatching (402) an individual instruction to a first half of a third entry in the double issue queue. Dispatching (402) an individual instruction to a first half of a third entry in the double issue queue may be carried out by a dispatcher issuing the individual instruction to the double issue queue. The dispatcher may be notified of an available entry in the double issue queue, and subsequently target the available entry for placement of the individual instruction.

The individual instruction may be placed in an entry in the double issue queue in which another instruction is stored in the other half of the entry. Specifically, the third entry may, at the time the individual instruction is dispatched, contain an instruction in a second half of the third entry. The instruction stored in the other half of the entry may be another individual instruction or may be one instruction of a pair of instructions where the other paired instruction was previously issued.

The issue queue logic may subsequently issue the individual instruction by accessing one or more age arrays for the double issue queue. The issue queue logic may determine that the individual instruction has each required dependency available and has reached an age threshold (e.g., the individual instruction is the oldest ready instruction in the age array).

For further explanation, FIG. 5 sets forth a flow chart illustrating a further exemplary method for managing an issue queue for fused instructions and paired instructions in a microprocessor according to embodiments of the present invention that includes dispatching (302) a fused instruction to a first entry in a double issue queue, wherein the fused instruction occupies two halves of the first entry in the double issue queue; dispatching (304) two paired instructions to a second entry in the double issue queue, wherein a first instruction of the two paired instructions occupies a first half of the second entry in the double issue queue, and wherein a second instruction of the two paired instructions occupies a second half of the second entry in the double issue queue; issuing (306), by issue queue logic (208), the fused instruction during a single cycle to an execution unit in response to determining, by the issue queue logic (208), that the fused instruction is ready to issue; and issuing (308), by the issue queue logic (208), the first instruction of the two paired instructions to the execution unit in response to determining, by the issue queue logic (208), that the first instruction of the two paired instructions is ready to issue.

The method of FIG. 5 differs from the method of FIG. 3, however, in that dispatching (302) a fused instruction to a first entry in a double issue queue, wherein the fused instruction occupies two halves of the first entry in the double issue queue includes adding (502) a slot in the even age array for a first half of the fused instruction and adding a slot in the odd age array for a second half of the fused instruction. Adding (502) a slot in the even age array for a first half of the fused instruction and adding a slot in the odd age array for a second half of the fused instruction may be carried out by locating the slot in the even age array that corresponds to the first half of the first entry and locating the slot in the odd age array that corresponds to the second half of the first entry.

Adding (502) a slot in the even age array for a first half of the fused instruction and adding a slot in the odd age array for a second half of the fused instruction may also be carried out by storing an age indicator in the slot in the even age array and the slot in the odd age array for the fused instruction. The slot in the even age array and the slot in the odd age array may store the same age indicator indicating that both halves of the fused instruction were placed in the double issue queue at the same time.

The method of FIG. 5 also differs from the method of FIG. 3, in that the method of FIG. 5 further includes determining (504), by the issue queue logic (208), that the fused instruction is the oldest ready instruction in the even age array, wherein at least one instruction in the odd age array is older than the fused instruction and ready to issue. Determining (504), by the issue queue logic (208), that the fused instruction is the oldest ready instruction in the even age array, wherein at least one instruction in the odd age array is older than the fused instruction and ready to issue may be carried out by the issue queue logic (208) inspecting the state of the data dependencies and age indicators for each instruction in the even age array. By comparing the age indicators for each instruction with data dependencies that are ready to be read, the issue queue logic (208) may determine that the fused instruction is the oldest ready to issue instruction in the even age array.

A similar process may be performed on the odd age array. The issue queue logic (208) may inspect the state of the data dependencies and age indicators for each instruction in the odd age array. By comparing the age indicators for each instruction with data dependencies that are ready to be read, the issue queue logic (208) may determine that the fused instruction is not the oldest ready to issue instruction in the even age array. Rather, the odd age array may include a slot for an instruction with an age indicator indicating that the instruction is older than the fused instruction.

The method of FIG. 5 also differs from the method of FIG. 3, in that the method of FIG. 5 further includes issuing (506), by the issue queue logic (208), the fused instruction before the at least one instruction in the odd age array that is older than the fused instruction and ready to issue. Issuing (506), by the issue queue logic (208), the fused instruction before the at least one instruction in the odd age array that is older than the fused instruction and ready to issue may be carried out by issuing both halves of the fused instruction together (i.e., in parallel) to the execution unit before issuing the instruction that is older and with data dependencies that are ready to be read according to the odd age array.

Figure 6:
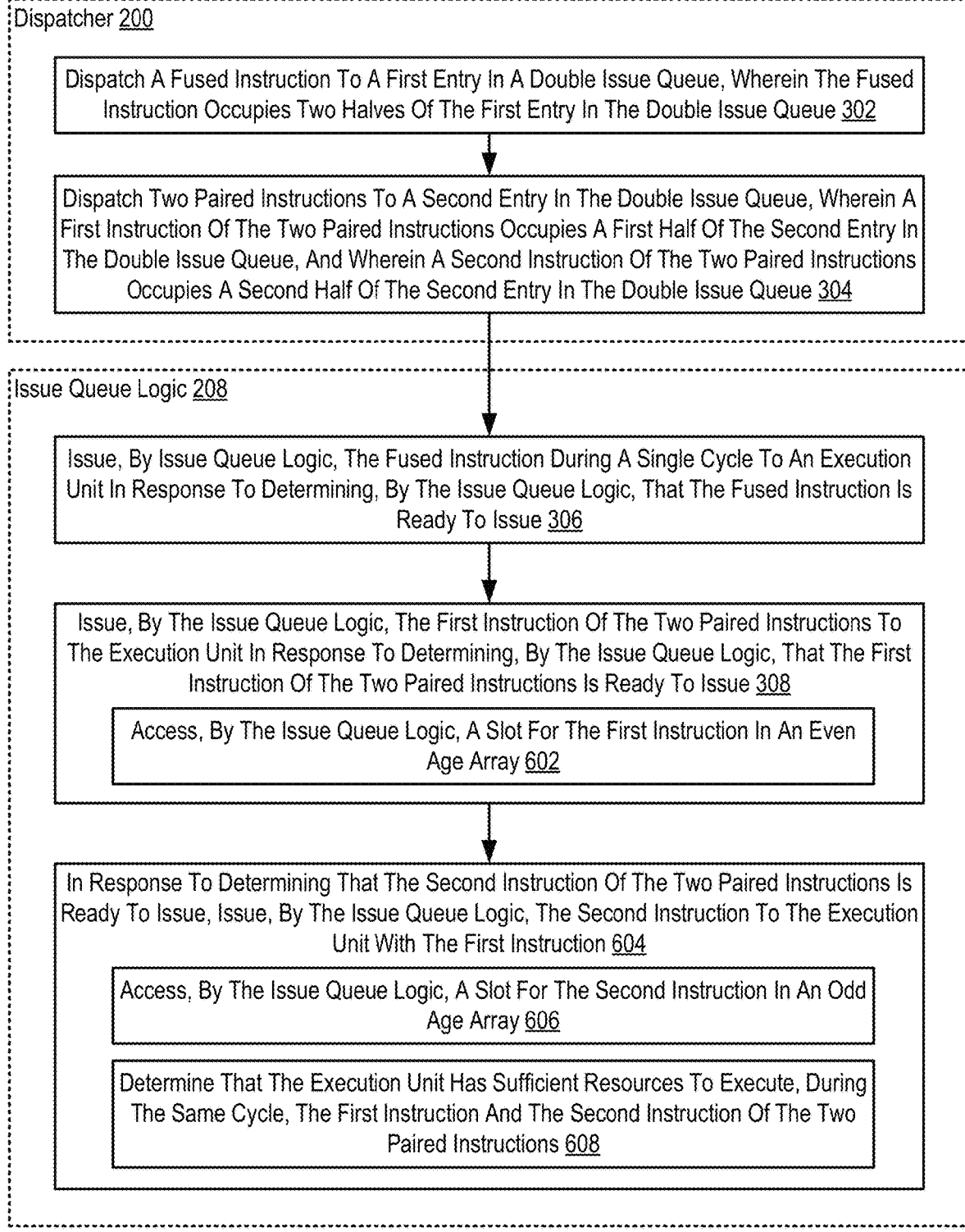
FIG. 6 sets forth a flow chart illustrating an exemplary method for managing an issue queue for fused instructions and paired instructions in a microprocessor according to embodiments of the present invention.

For further explanation, FIG. 6 sets forth a flow chart illustrating a further exemplary method for managing an issue queue for fused instructions and paired instructions in a microprocessor according to embodiments of the present invention that includes dispatching (302) a fused instruction to a first entry in a double issue queue, wherein the fused instruction occupies two halves of the first entry in the double issue queue; dispatching (304) two paired instructions to a second entry in the double issue queue, wherein a first instruction of the two paired instructions occupies a first half of the second entry in the double issue queue, and wherein a second instruction of the two paired instructions occupies a second half of the second entry in the double issue queue; issuing (306), by issue queue logic (208), the fused instruction during a single cycle to an execution unit in response to determining, by the issue queue logic (208), that the fused instruction is ready to issue; and issuing (308), by the issue queue logic (208), the first instruction of the two paired instructions to the execution unit in response to determining, by the issue queue logic (208), that the first instruction of the two paired instructions is ready to issue.

The method of FIG. 6 differs from the method of FIG. 3, however, in that issuing (308), by the issue queue logic (208), the first instruction of the two paired instructions to the execution unit in response to determining, by the issue queue logic (208), that the first instruction of the two paired instructions is ready to issue includes accessing (602), by the issue queue logic (208), a slot for the first instruction in an even age array. Accessing (602), by the issue queue logic (208), a slot for the first instruction in an even age array may be carried out by reading a slot in the even age array that corresponds to the first half of the second entry in the double issue queue. The first half of each entry may be tracked in the even age array and the second half of each entry may be tracked in the odd age array.

The method of FIG. 6 also differs from the method of FIG. 3, in that the method of FIG. 5 further includes in response to determining that the second instruction of the two paired instructions is ready to issue, issuing (604), by the issue queue logic (208), the second instruction to the execution unit with the first instruction. Issuing (604), by the issue queue logic (208), the second instruction to the execution unit with the first instruction may be carried out by issuing the first instruction and the second instruction in parallel during the same cycle. Determining that the second instruction of the two paired instructions is ready to issue includes accessing (606), by the issue queue logic (208) a slot for the second instruction in an odd age array.

Accessing (606), by the issue queue logic (208), a slot for the second instruction in an odd age array may be carried out by reading a slot in the odd age array that corresponds to the second half of the second entry in the double issue queue. The issue queue logic may inspect each data dependency for the second instruction in the odd age array to verify that each data dependency is ready to be read. The issue queue logic may then compare the age indicator for the second instruction of the paired instructions to the age indicator for each other instruction tracked by the odd age array. If each data dependency is ready to be read, and the age indicator indicates that the second instruction is the oldest instruction in the odd age array (or otherwise has reached an age threshold), then the issue queue logic may determine that the second instruction is ready to issue. If this determination is made concurrently with the determination that the first instruction is also ready to issue, then the first instruction and the second instruction may be issued together (i.e., in parallel).

Determining that the second instruction of the two paired instructions is ready to issue also includes determining (608) that the execution unit has sufficient resources to execute, during the same cycle, the first instruction and the instruction of the two paired instructions. Determining (608) that the execution unit has sufficient resources to execute, during the same cycle, the first instruction and the instruction of the two paired instructions may be carried out by comparing the necessary resources required by the execution unit to execute the second instruction to the resources currently available (or predicted to be available) in the execution unit. If there are sufficient resources in the execution unit to execute both the first instruction and second instruction of the paired instructions, and all other requirements are fulfilled (e.g., data dependencies ready, age threshold reached), then the paired instructions may be issued together. If only the first instruction meets the criteria to issue, the second instruction may then issue at a later time (i.e., during a later cycle).

In view of the explanations set forth above, readers will recognize that the benefits of managing an issue queue for fused instructions and paired instructions in a microprocessor according to embodiments of the present invention include:

Improving the operation of a computing system by incorporating a double issue queue capable of storing fused instructions, paired instructions, and individual instructions in the same issue queue, increasing computing system efficiency.

Improving the operation of a computing system by managing a double issue queue using different age arrays for each portion of the double issue queue entries, increasing computing system functionality.

Exemplary embodiments of the present invention are described largely in the context of a fully functional computer system for managing an issue queue for fused instructions and paired instructions in a microprocessor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing an issue queue for fused instructions and paired instructions in a microprocessor, the microprocessor comprising a dispatcher and an execution slice, wherein the execution slice includes a double issue queue, issue queue logic, an execution unit, a first age array, and a second age array, the method comprising:
    dispatching a fused instruction to a first entry in the double issue queue, wherein the fused instruction occupies two halves of the first entry in the double issue queue, wherein an age of each instruction in the double issue queue is tracked using the first age array and the second age array, and wherein dispatching the fused instruction to the first entry in the double issue queue comprises adding a slot in the first age array for a first half of the fused instruction and adding a slot in the second age array for a second half of the fused instruction;
    determining, by the issue queue logic, that the fused instruction is an oldest ready instruction in the first age array, wherein at least one instruction in the second age array is older than the fused instruction and ready to issue; and
    issuing, by the issue queue logic, the fused instruction before the at least one instruction in the second age array that is older than the fused instruction and ready to issue.

2. The method of claim 1, further comprising:
    dispatching two paired instructions to a second entry in the double issue queue, wherein a first instruction of the two paired instructions occupies a first half of the second entry in the double issue queue, and wherein a second instruction of the two paired instructions occupies a second half of the second entry in the double issue queue; and
    issuing, by the issue queue logic, the first instruction of the two paired instructions to the execution unit in response to determining, by the issue queue logic, that the first instruction of the two paired instructions is ready to issue.

3. The method of claim 2, further comprising:
    dispatching an individual instruction to a first half of a third entry in the double issue queue.

4. The method of claim 3, further comprising:
    in response to determining that the second instruction of the two paired instructions is ready to issue, issuing, by the issue queue logic, the second instruction to the execution unit with the first instruction.

5. The method of claim 4, wherein determining that the second instruction of the two paired instructions is ready to issue comprises determining that the execution unit has sufficient resources to execute, during the same cycle, the first instruction and the second instruction of the two paired instructions.

6. The method of claim 4,
    wherein determining, by the issue queue logic, that the first instruction of the two paired instructions is ready to issue comprises accessing, by the issue queue logic, a slot for the first instruction in the first age array, and
    wherein determining that the second instruction of the two paired instructions is ready to issue comprises accessing, by the issue queue logic, a slot for the second instruction in the second age array.

7. The method of claim 3, wherein the first entry and the second entry are adjacent to each other in the double issue queue.

* * * * *